Nov. 20, 1962 W. E. N. DOTY 3,065,453
COMPOSITING SEQUENTIALLY PRODUCED SIGNALS
Filed Jan. 5, 1959 2 Sheets-Sheet 1
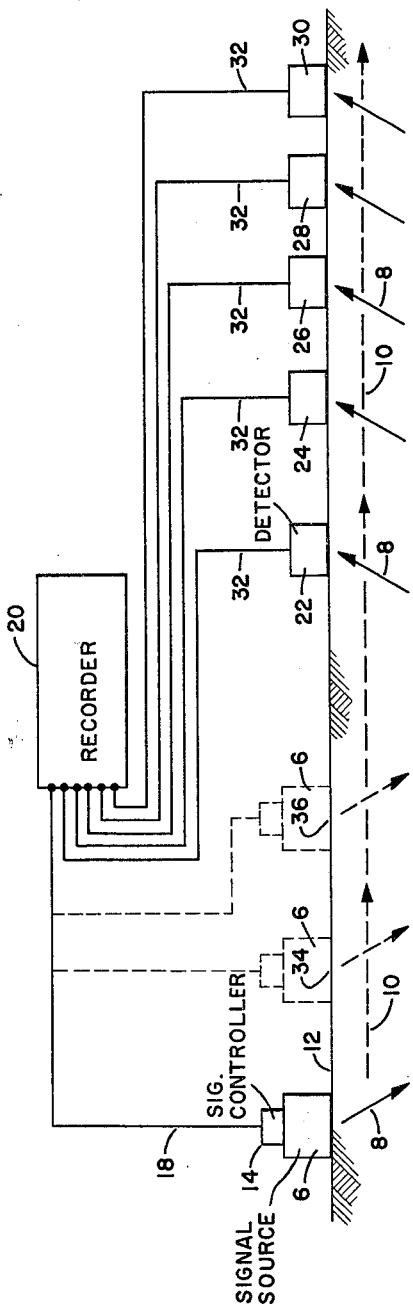
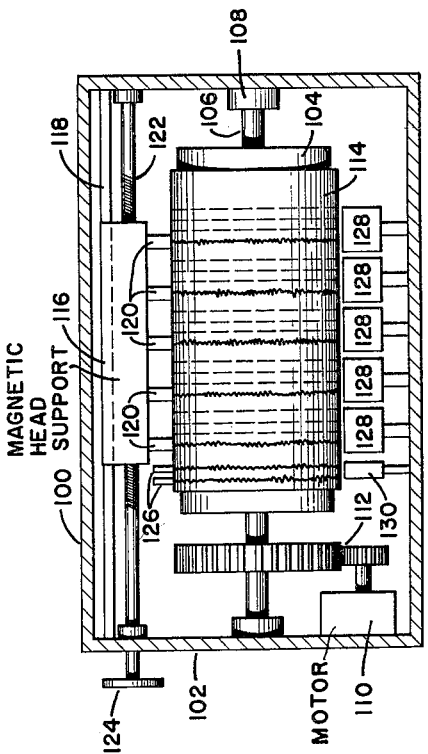
INVENTOR.
WILLIAM E. N. DOTY
BY
*Floyd Trimble*
ATTORNEY Nov. 20, 1962 W. E. N. DOTY 3,065,453
COMPOSITING SEQUENTIALLY PRODUCED SIGNALS
Filed Jan. 5, 1959 2 Sheets-Sheet 2

INVENTOR.
WILLIAM E. N. DOTY
BY
*Floyd Trimble*
ATTORNEY

United States Patent Office 3,065,453
Patented Nov. 20, 1962

3,065,453
COMPOSITING SEQUENTIALLY PRODUCED
SIGNALS
William E. N. Doty, Ponca City, Okla., assignor to Continental Oil Company, Ponca City, Okla., a corporation of Delaware
Filed Jan. 5, 1959, Ser. No. 785,033
8 Claims. (Cl. 340—15.5)

This invention relates generally to an improved method and apparatus for compositing a series of sequentially-produced individual signals, and more particularly, but not by way of limitation, to improvements in the art of seismic prospecting.

As it is well known in the art of reflection type seismic prospecting, a seismic disturbance created at or near the surface of the earth generates various types of seismic waves, i.e., various components of the initial seismic wave, which follow different paths before reaching spaced detecting stations. Since the purpose of the reflection method is to determine the depth of geological reflectors and discover their structural features, only reflection paths are of interest and convey the desired information. The other paths create a perturbing effect which is commonly designated interference or noise. Examples of the undesired paths are surface, refraction, diffraction, and scatter. However, the vertical or substantially vertical reflections reach spaced detectors substantially simultaneously; whereas, the interference or noise reaches the detectors at varying times. In other words, while the interferences and noises have substantial or random phase differences between spaced detector locations, the reflected waves are substantially in phase at all the receiving points.

One of the most popular procedures for minimizing the effect of interference and noise is by what is commonly known in the art as a compositing procedure. Several different seismic disturbances are sequentially created at spaced transmitting stations and the resulting seismic waves are detected by a plurality of detectors, with the detectors being located in the same positions during the creation of each seismic disturbance of the series. The seismic energy received at each detector location is usually recorded on a magnetic recording medium, such that a recorded trace or track is provided for each detector location corresponding to each seismic disturbance of the series. The tracks corresponding to each detector location are then simultaneously, but individually, reproduced to provide a plurality of individual electrical signals corresponding to the individual seismic signals received at the respective location. These individual electrical signals are then combined in a relatively complicated mixing circuit to provide a composite signal for each detector location. It will be apparent to those skilled in the art that when a set of the individual signals are composited in a mixing circuit, the random interference and noise will be minimized to provide a resulting signal from which reflections may be located.

The present invention contemplates a method of compositing a series of sequentially produced signals which is particularly useful in seismic prospecting and which broadly comprises the steps of applying each signal of the series to a magnetic recording head, moving a recording medium adjacent the recording head as each signal of the series is applied to the recording head, indexing the recording head transverse to the direction of movement of the recording medium after the application of each signal of the series to the recording head to produce a set of parallel magnetic tracks on the recording medium, with each track representing one of the signals of the series, then simultaneously scanning all of the tracks in said set with a single reproducing head to produce a composite signal having an instantaneous amplitude equal to the algebraic addition of the instantaneous amplitudes of the signals of the series.

An important object of this invention is to improve present methods of reflection type seismic prospecting.

Another object of this invention is to provide a novel method and apparatus for producing a composite signal from a series of sequentially produced individual signals in an efficient and economical manner.

A further object of this invention is to minimize the complexity and cost of the equipment required to composite a series of sequentially produced signals.

Another object of this invention is to provide the maximum utilization of the data storage capacity of a recording medium being used in a system for compositing a series of sequentially produced signals.

Other objects and advantages of the invention will be evident from the following detailed description, when read in conjunction with the accompanying drawings which illustrate my invention.

In the drawings:

FIG. 1 is a diagrammatic illustration of a field procedure embodying the present invention.

FIG. 4 is a schematic plan view of a combination compositing recorder and reproducer constructed in accordance with this invention.

Figure 2:
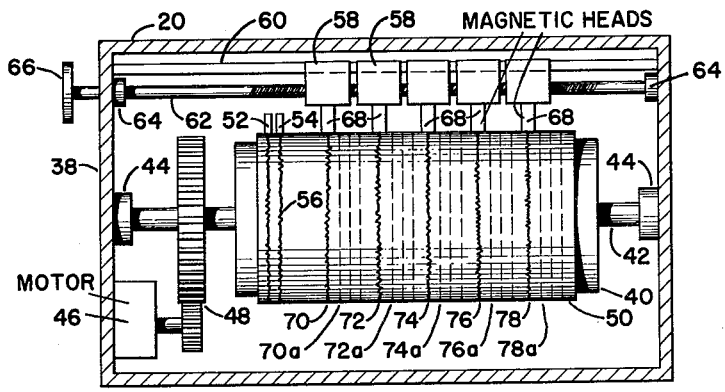
FIG. 2 is a plan view of a compositing recorder used in practicing the present invention, with the major portion of the recorder being shown schematically to more clearly illustrate the invention.

Referring to the drawings in detail, and particularly FIG. 1, reference character 6 designates an energy source of any suitable type capable of generating a seismic signal in the earth. As previously indicated, various components of the seismic waves generated by the source 6 will follow various paths through the earth, and, for purposes of illustration, I have shown only two paths 8 and 10, with the path 8 indicating a reflection type of wave and the path 10 indicating a surface wave which travels along the surface 12 of the earth. A suitable controller 14 is mounted on the source 6 for controlling the operation of the source 6. The controller 14 is energized by signals fed thereto through a conductor 18 from a novel recording mechanism 20, as will be more fully hereinafter set forth.

A plurality of detectors 22, 24, 26, 28 and 30 are positioned on the surface 12 of the earth in spaced relation with respect to one another and in spaced relation with respect to the source 6. As indicated by the arrows or paths 8 and 10, each of the detectors 22 through 30 will receive seismic waves which have followed various paths from the source 6. The detectors 22 through 30 operate in the usual fashion to convert seismic signals to electrical signals. The respective electrical signals provided by each detector are fed through its respective conductor 32 to the novel recording apparatus 20. It may also be noted that each of the detectors 22 through 30 may actually be a single detector at each of the receiving locations or stations noted on the drawing, or a nest of detectors at each of such locations. In the event several nests of detectors are used, all of the signals provided by the detectors of each nest are normally combined in a common conductor 32 and fed to the recorder 20.

In operation of a system of the type illustrated in FIG. 1, the source 6 is first activated in response to a signal fed from the recorder 20 through the conductor 18, with the source 6 being positioned as illustrated in full lines in FIG. 1. The resulting seismic waves generated in the earth are received at all of the detectors 22 through 30 and each of the detectors feeds an electrical signal to the recorder 20 corresponding to the seismic energy received.

The source 6 is then moved to a location designated by reference character 34 and is again operated by a signal being fed through the conductor 18. The resulting seismic waves are received by the detectors 22 through 30, converted to electrical signals, and then fed through the conductors 32 to the recorder 20. The source 6 is then again moved to another transmitting station 36 and the procedure is repeated. Any desired number of transmissions may be used, depending upon the difficulties encountered in a specific geographical area. Also, any desired number of detectors or detector nests may be used to obtain the desired records.

The recorder 20 is illustrated in detail in FIG. 2 and comprises a suitable frame 38 having a cylindrical drum 40 rotatably supported therein by means of a shaft 42 extending lengthwise through the center of the drum and mounted in bearings 44 in the opposite ends of the frame 38. A suitable motor 46 is also supported in the frame 38 and drives the drum 40 through a gear system 48 to provide rotation of the drum 40 around its longitudinal axis at the desired speed. The drum 40 may be formed out of a material which functions as a magnetic recording medium, or a sheet 50 of a magnetic recording medium may be secured around the periphery of the drum in any suitable manner, such as illustrated in U.S. Patent No. 2,806,757. When a separate recorder and reproducer is being used, the separate sheet 50 of recording medium must, as a practical matter, be used.

A pair of magnetic recording heads 52 and 54 are mounted in the frame 38 in stationary positions adjacent the periphery of the drum 40, preferably at one end of the drum. The head 52 is utilized to record a timing trace on the recording medium 50 and the head 54 is utilized to record what will be hereinafter referred to as a synchronizing track on the recording medium 50. The head 54 is also used to reproduce the synchronizing track 56 at each rotation of the drum 40, and is connected to the source 6 by the conductor 18 illustrated in FIG. 1. Thus, the same signal represented by the synchronizing track 56 is used to control each operation of the source 6 and provide similar transmissions by the source 6 at the various transmitting stations. The timing track provided by the head 52 is used to interpret the time relation of the other tracks recorded on the recording medium 50.

A plurality of holders 58 are slidingly secured on one side of the frame 38 on a slide bar 60 for movement parallel with the longitudinal axis of the drum 40. This longitudinal movement of the heads 58 is controlled by a shaft 62 supported by bearings 64 at the opposite ends of the frame and threaded through each of the holders 58. A suitable dial and hand wheel 66 is secured on one end of the shaft 62 to provide precise manual control of the movement of the holders 58. It will also be noted that the holders 58 may be easily threaded onto the shaft 62 in such a manner that the holders 58 will be moved equal distances upon turning of the shaft 62. A magnetic recording head 68 is carried by each of the holders 58 adjacent the outer periphery of the drum 40 to record tracks 70, 72, 74, 76, and 78 on the recording medium 50. Any desired number of holders 58 and recording heads 68 may be used, depending upon the size of the recording medium 50, and each of the recording heads 68 is connected to one of the detectors or nests of detectors 22 through 30 illustrated in FIG. 1 by the respective conductor 32.

In operation of the recorder 20, the holders 58 are moved to one extremity of the recording medium 50 as illustrated in full lines in FIG. 2. The drum 40 is then turned to feed the synchronizing signal reproduced by the head 54 through the conductor 18 to control the operation of the source 6. The resulting seismic waves received by the various detectors 22 through 30 are recorded by the heads 68 as the tracks 70 through 78.

At the completion of one rotation of the drum 40, the drum is stopped and the recording heads 68 are indexed to the right (when viewed as in FIG. 2) by turning the shaft 62. As the recording heads 68 are being indexed, the source 6 is moved to a new transmitting location. The drum 40 is then again turned to operate the source 6 in accordance with the signal reproduced from the synchronizing track 56 and the new seismic waves received at the detectors 22 through 30 are recorded by the heads 68 on the recording medium 50 as indicated by the dashed lines 70a, 72a, ... 78a. This operation is repeated at each of the transmitting stations of the source 6 to propide a set of parallel tracks on the recording medium 50 corresponding to the series of seismic signals received at each of the detector locations, with each track corresponding to one received signal of the series. It will also be noted that when the drum 40 is turned at a uniform speed, the relative circumferential positions of the tracks 70, 70a, 72, 72a, ... 78a with respect to the synchronizing track 56 represent the difference in times between transmissions and receptions of the seismic signals.

Figure 3:
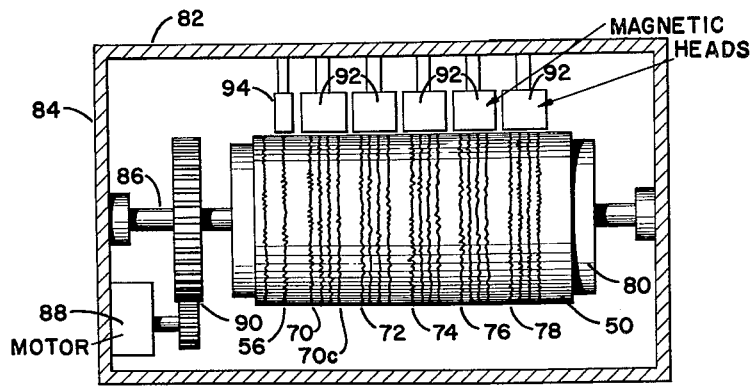
FIG. 3 is a plan view of a compositing reproducer used in practicing this invention, with the major portion of the apparatus being illustrated schematically.

When the desired number of transmissions have been made, the recording medium 50 is transferred from the drum 40 of the recorder 20 to the drum 80 of a reproducer generally designated by reference character 82 and illustrated in FIG. 3. Reproducer 82 comprises a suitable frame 84 having shaft 86 journaled in the opposite ends thereof to rotatably support the drum 80 in the frame. The drum 80 is turned by a suitable motor 88 through a suitable gear system 90 in the usual fashion. A magnetic reproducing head 92 is supported in a fixed position in the frame 84 opposite each set of parallel tracks recorded on the medium 50 by the recording heads 68 of the recorder 20, and each reproducing head is of a size to scan all of the tracks in the respective set. In other words, one of the reproducing heads 92 is positioned opposite the tracks 70 through 70c recorded on the medium 50 by the recording head 68 located closest to the stationary head 54 in the recorder 20, and the remaining reproducing heads 92 are similarly located with respect to the tracks recorded by the remaining heads 68. In this connection it will be noted that the reproducing heads 92 must be substantially wider than the recording heads 68, or at least substantially wider than the individual tracks. In one commercial form of the invention, the reproducing heads 92 are of standard size and the recording heads 68 are substantially smaller to provide tracks on the recording medium 50 of a width of about 0.012 inch and the heads 68 are indexed each time a distance sufficient to provide a spacing between adjacent tracks of each set of about 0.002 inch.

In operation of the reproducer 82, the drum 80 is turned by the motor 88 and gear system 90 to provide a simultaneous scanning of all of the tracks in each set of tracks opposite each reproducing head 92. As a result, each reproducing head 92 provides a compositing of all of the signals represented by the tracks scanned by the respective head and provides a composite signal having an instantaneous amplitude equal to the algebraic addition of the instantaneous amplitudes of all of the signals of each series of signals received by one of the detectors. And, since all of the received signals of a series are synchronized with respect to the respective transmissions upon being recorded on the medium 50, all signals represented by each set of tracks will be equivalent to the simultaneous transmission of the signals through the earth, in that the random variations in the signals will be minimized and the synchronized variations resulting from reflected waves will be intensified in the composite signal. In addition, another reproducing head 94 may be supported in a fixed position in the frame 84 of the reproducer 82 adjacent the track 56 to reproduce the synchronizing signal simultaneously with the compositing provided by the heads 92 to preserve the time relationship between the transmitted and received signals.

A combination compositing recorder and reproducer of the type illustrated in FIG. 4 and generally designated by reference character 100 may be used in lieu of the recorder 20 and reproducer 82 if desired. The combination recorder and reproducer 100 comprises a suitable frame 102 having a drum 104 rotatably supported therein by means of a shaft 106 journaled at its opposite ends in bearings 108 at the opposite ends of the frame. A suitable motor 110 is also mounted on the frame 102 and is connected to the shaft 106 by a gear system 112 for rotating the drum 104 about its longitudinal axis. A sheet 114 of a magnetic recording medium is secured around the periphery of the drum 104 in the manner described in connection with FIGS. 2 and 3.

An elongated holder 116 is slidingly secured in the frame 102 on a bar 118 for movement parallel with the longitudinal axis of the drum 104. A plurality of magnetic recording heads 120 are carried by the holder 116 in spaced relation along the length of the drum 104 and in proximity with the outer periphery of the drum 104. The heads 120 are connected to the detectors 22 through 30 of the system illustrated in FIG. 1 to record a plurality of sets of tracks on the recording medium 114, with each set of tracks representing the signals received at the respective detector location during a series of transmissions by the source 6. The holder 116 and the heads 120 are indexed along the recording medium 114 by means of a shaft 122 rotatably supported in the frame 102 and threaded through the holder 116. A combination dial and hand wheel 124 is secured on the shaft 122 to manually control the indexing movement of the holder 116 and recording heads 120. Also, a pair of stationary magnetic recording heads 126 are provided in the frame 102 to produce the timing and synchronizing tracks on the recording medium 114 in the manner previously described in connection with the recording heads 52 and 54 in the recorder 20.

A plurality of magnetic reproducing heads 128 are supported in fixed positions in the frame 102 in circumferentially spaced relation with respect to the recording heads 120. It will also be observed that each reproducing head 128 is so positioned and is of a size to scan all of the tracks on the recording medium 114 which are recorded by one of the recording heads 120. Also, a separate magnetic reproducing head 130 may be secured in the frame 102 in a fixed position for reproducing the synchronizing signal.

In view of the detailed description of the operation of the separate recorder 20 and separate reproducer 82, the operation of the combination recorder and reproducer 100 needs be only briefly described. Each detector or detector nest of a system as illustrated in FIG. 1 is connected to one of the recording heads 120. Upon rotation of the drum 104, the synchronizing signal is fed to the source 6, and the recording heads 120 simultaneously record the seimic signals received by the various detectors. After one complete rotation of the drum 104, the recording heads 120 are indexed into positions to form the tracks indicated by dashed lines adjacent the tracks shown in full lines in FIG. 4; whereupon activation of the source 6 and the recording of the received seismic signals are repeated. This complete cycle is repeated for the desired number of transmissions. It may be noted that the reproducing heads 128 and 130 are de-activated during the recording operation.

At the completion of the recording operation, when using the apparatus illustrated in FIG. 4, the recording heads 120 and 126 are de-activated and the reproducing heads 128 and 130 are activated. It will then be apparent that upon rotation of the drum 104 each set of tracks produced by each of the recording heads 120 will be simultaneously scanned by one of the reproducing heads 128 for the compositing operation. Also, the synchronizing signal will be reproduced by the head 130.

When using either the separate recorder 20 and reproducer 82 or the combination recorder and reproducer 100, it is desirable that the magnetic tracks made by each recording head be placed as close together as possible to minimize the required data storage area and to minimize the required size of the reproducing heads. The width of each track is limited only by the required signal-to-noise ratio required in the specific area being investigated. As it is well known in the art, the wider the magnetic track, the greater the signal-to-noise ratio. As previously indicated, a track width of 0.012 inch has been used in a commercial embodiment of the present invention with acceptable results. The minimum spacing between adjacent tracks made by each recording head is limited only by the erasing effect. Each recording head is provided with a biasing current during the recording operation and this biasing current tends to erase all information on the recording medium adjacent the track being recorded. It may be noted, however, that the merging of two adjacent tracks of any particular set of tracks, that is, cross-talk, is no problem in the present invention since the reproduction of a complete set of the tracks by a single reproducing means provides one hundred percent crosstalk. In a commercial system embodying this invention, and as previously indicated, a spacing of 0.002 inch between the adjacent tracks of each set of tracks has been found practical.

From the foregoing it will be apparent that the present invention provides a novel method of seismic prospecting wherein the seismic energy transmitted over unwanted paths will be effectively minimized and the resulting records more easily interpreted. A large number of sequential transmissions may be used for an effective compositing operation, without the necessity of a complicated mixing circuit. A prospecting method utilizing this invention may be practiced in a minimum of time, with a minimum of equipment, and more economically than previously. It may also be noted that the present method and apparatus for compositing a series of sequentially produced signals is useful in many different seismic prospecting techniques. For example, the present invention may be used in a seismic prospecting method employing a short-time duration signal (such as when dynamite or the dropping of a weight is utilized as the energy source) as well as in a method employing a long-time duration signal (such as when a vibrator is used as the energy source).

It will also be apparent that the present invention provides a novel method and apparatus for compositing a series of sequentially produced signals, wherein the composite signal will have an instantaneous amplitude equal to the algebraic addition of the instantaneous amplitudes of all the individual signals of the series. Random information in the individual signals of a series is effectively minimized in the resulting composite signal; whereas the composite signal intensifies the in-phase, desired information in the individual signals. When applied to reflection type seismic prospecting, the present method and apparatus of compositing a series of sequentially produced signals provides intensification of reflected seismic energy. It will be further apparent that the present method and apparatus requires a minimum of data storage area and a minimum amount of equipment.

Changes may be made in the combination and arrangement of steps and procedures, as well as parts or elements, as heretofore set forth in the specification and shown in the drawings without departing from the spirit and scope of the invention as defined in the following claims.

I claim:

1. A system for compositing a series of sequentially produced signals, comprising a magnetic recording head, means for applying each signal of the series to the recording head as the signal is produced, a recording medium, means for repeatedly moving the recording medium along a predetermined path adjacent the recording head, means for indexing the recording head transversely with respect to the path of movement of the recording medium after the application of each signal of the series to the recording head to provide a set of parallel magnetic tracks on the recording medium, and a magnetic reproducing head of a size to simultaneously scan the entire set of magnetic tracks to produce a composite signal having an instantaneous amplitude equal to the algebraic addition of the instantaneous amplitudes of the signals of the series.

2. A system as defined in claim 1 wherein the recording medium is cylindrical in configuration and is rotated about its longitudinal axis for such movement along a predetermined path.

3. Apparatus for compositing a series of sequentially produced signals, comprising a frame, a magnetic drum supported in the frame for rotation about its longitudinal axis, means for rotating the drum, a magnetic recording head slidingly supported on the frame adjacent the drum, means for applying the signals of the series to the recording head as the signals are produced, means for indexing the recording head in a direction parallel to the axis of the drum after the application of each signal of the series to the recording head to provide a set of parallel magnetic tracks around the drum, and a magnetic reproducing head supported on the frame in a position and being of a size to scan the entire set of tracks during a rotation of the drum to produce a composite signal having an instantaneous amplitude equal to the algebraic addition of the instantaneous amplitudes of all the signals of the series.

4. Apparatus as defined in claim 3 wherein the means for indexing the recording head comprises a holder supporting the head adjacent the outer periphery of the drum, a shaft rotatably supported in the frame parallel with the longitudinal axis of the drum and threaded through said holder, and means for turning said shaft.

5. Apparatus as defined in claim 3 wherein said magnetic drum comprises a drum and a sheet of magnetic material releasably secured around the periphery of the drum to record said tracks.

6. Apparatus for compositing a series of sequentially produced signals, comprising a first frame, a first drum supported in the first frame for rotation about its longitudinal axis, means for rotating the first drum, a sheet of magnetic material releasably secured around the periphery of the drum, a magnetic recording head slidably supported on the first frame adjacent the outer periphery of the first drum, means for applying each signal of the series to the recording head as the respective signal is produced, means for indexing the recording head in a direction parallel with the longitudinal axis of the drum after the application of each signal of the series to the recording head to provide a set of parallel magnetic tracks on the magnetic sheet, a second frame, a second drum supported in the second frame for rotation about its longitudinal axis and being of a size to support said magnetic sheet around its periphery, means for rotating the second drum, and a magnetic reproducing head supported on the second frame adjacent the outer periphery of the second drum and being of a size to scan the entire set of tracks on said sheet during one rotation of the second drum to produce a composite signal having an instantaneous amplitude equal to the algebraic addition of instantaneous amplitudes of all the signals of the series.

7. Apparatus for recording the simultaneous signals sequentially produced by a plurality of seismic detectors, comprising:

a frame;
a drum rotatably supported on the frame;
a sheet of magnetic recording material releasably secured on the drum;
a plurality of recording heads;
means for electrically connecting each recording head to a separate seismic detector;
support means on the frame supporting the recording heads in spaced relation along the longitudinal axis of the drum in positions to record tracks on the magnetic material; and
means for simultaneously indexing the recording heads along the length of the drum between the sequentially produced signals to provide a record comprising a plurality of sets of side-by-side tracks on the magnetic recording material representative of the sequentially produced signals provided by the various detectors.

8. Apparatus for reproducing the record provided by the apparatus defined in claim 7, comprising:

a frame;
a drum rotatably supported in the frame;
means on the drum for securing the record therearound;
a plurality of reproducing heads supported on the frame in longitudinally spaced relation along the drum with a reproducing head positioned adjacent each set of tracks on the record, each of said reproducing heads being of a size to simultaneously scan all of the tracks in the respective set of tracks; and
means for rotating the drum, whereby each reproducing head produces a composite signal having an instantaneous amplitude equal to the algebraic addition of the instantaneous amplitudes of all the signals represented by the respective set of tracks scanned.

References Cited in the file of this patent

UNITED STATES PATENTS

| | | |
|---|---|---|
| 2,243,730 | Ellis | May 27, 1941 |
| 2,531,642 | Potter | Nov. 28, 1950 |
| 2,876,428 | Skelton | Mar. 3, 1959 |